US007685688B2

(12) United States Patent
Fan

(10) Patent No.: US 7,685,688 B2
(45) Date of Patent: Mar. 30, 2010

(54) FORCED PULLER

(76) Inventor: Chen Jun Fan, 5F.-2, No. 212, Sec. 1, Wunsin Rd., Taichung City (408) (TW)

( * ) Notice: Subject to any disclaimer, the term of this patent is extended or adjusted under 35 U.S.C. 154(b) by 0 days.

(21) Appl. No.: 12/152,045

(22) Filed: May 13, 2008

(65) Prior Publication Data

US 2009/0194750 A1 Aug. 6, 2009

(30) Foreign Application Priority Data

Feb. 4, 2008 (TW) .............................. 97202341 U

(51) Int. Cl.
*B23P 19/04* (2006.01)

(52) U.S. Cl. ............................ 29/259; 29/256; 29/270; 29/262

(58) Field of Classification Search ................... 29/259, 29/255, 261, 262, 270, 278
See application file for complete search history.

(56) References Cited

U.S. PATENT DOCUMENTS 4,492,014 A * 1/1985 Alexander ................... 29/259
4,989,311 A * 2/1991 Rosin .......................... 29/259
5,177,852 A * 1/1993 James ......................... 29/259
5,319,832 A * 6/1994 Clement ...................... 29/266
5,557,833 A * 9/1996 Pool ............................ 29/261
5,887,328 A * 3/1999 Rydin et al. .................. 29/259
7,216,409 B1 * 5/2007 Chiu et al. .................... 29/259
2009/0194750 A1 * 8/2009 Fan ............................ 254/100

* cited by examiner

*Primary Examiner*—Lee D Wilson

(57) ABSTRACT

A forced puller includes a central seat having a threaded hole centrally defined therein and extending therethrough. The central seat has two opposite sides each having a rod perpendicularly extending therefrom relative to an axis of the threaded hole. Two hook members are respectively slidably mounted to a corresponding one of the two rods. Each hook member is formed with a hook engaged to a workpiece that is purposed to be detached. A main threaded rod is screwed through the threaded hole in the central seat. The main threaded rod has a polygonal head formed on a first end thereof for user to forcefully rotate the main threaded rod and a push portion is formed on a second end of the main threaded rod to securely and longitudinally abut against the workpiece after rotating the main threaded rod.

1 Claim, 8 Drawing Sheets

FORCED PULLER

BACKGROUND OF THE INVENTION

1. Field of the Invention

The present invention relates to puller, and more particularly to a forced puller that has a simple structure and is stably operated.

2. Description of Related Art

A conventional forced puller in accordance with the prior art shown in FIG. 8 comprises central seat (1) having a threaded hole (1*a*) centrally defined therein and extending therethrough. The central seat (1) has two opposite sides each having a rod (1) perpendicularly extending therefrom relative to an axis of the threaded hole (1*a*). Two hook members (2) are respectively pivotally mounted to a corresponding one of the two rods (1*b*) and correspond to each other. Each hook member (2) has a through hole (2*a*) laterally defined therein for pivotally received the corresponding rod (1*b*). Each hook member (2) includes a slot (2*b*) longitudinally defined therein and extending therethrough, and a hook (2*c*) extending from a distal end of each of the two hook members (2), wherein the two hooks (2*c*) are faced each other. A position seat (3) is mounted between the two hook members (2). The position seat (3) has a through hole (3*a*) centrally defined therein and co-axially aligning with the threaded hole (1*a*). The position seat (3) has two opposite sides each having a threaded rod (3*b*) perpendicularly extending therefrom relative to the through hole (3*a*). Each threaded rod (3*b*) extending through a corresponding one of the two slots (2*b*). Each threaded rod (3*b*) has a nut (3*c*) screwed thereon for positioning the position seat (3) after the threaded rod (3*b*) extending the corresponding slot (2*b*). A main threaded rod (4) is screwed through the threaded hole (1*a*) in the central seat (1). The main threaded rod (4) includes a polygonal head formed on a first end thereof for user to easily rotate the main threaded rod (4), a thread formed on an outer periphery of the main threaded rod (4) for coupling with the threaded hole (1*a*) and a operating portion (4*c*) formed on a second end of the main threaded rod (4) for longitudinally pushing the workpiece. The upper portion of each of the two hook members (2) is pivotally mounted to the corresponding rod (1*b*) and the middle portion of each of the two hook members (2) is positioned by the position seat (3). However, the two hook members (2) are unavoidably swayed during being operated. In addition, the slot (2*b*) will reduce the strength of the structure of each of the two hook members (2).

The present invention has arisen to mitigate and/or obviate the disadvantages of the conventional forced puller.

SUMMARY OF THE INVENTION

The main objective of the present invention is to provide an improved forced puller that is stable during operating and has a simplified structure.

To achieve the objective, the forced puller in accordance with the present invention comprises a central seat having a threaded hole centrally defined therein and extending therethrough. The central seat has two opposite sides each having a rod perpendicularly extending therefrom relative to an axis of the threaded hole. Each rod has a groove longitudinally defined in an outer periphery thereof. Two hook members are respectively slidably mounted to a corresponding one of the two rods. Each hook member is formed with a hook engaged to a workpiece that is purposed to be detached. Each hook member has a locking member extending therethrough and partially received in a corresponding one of the two grooves for holding the hook member in place. A main threaded rod is screwed through the threaded hole in the central seat. The main threaded rod has a polygonal head formed on a first end thereof for user to forcefully rotate the main threaded rod and a push portion is formed on a second end of the main threaded rod to securely and longitudinally abut against the workpiece after rotating the main threaded rod.

Further benefits and advantages of the present invention will become apparent after a careful reading of the detailed description with appropriate reference to the accompanying drawings.

DETAILED DESCRIPTION OF THE INVENTION

Figure 1:
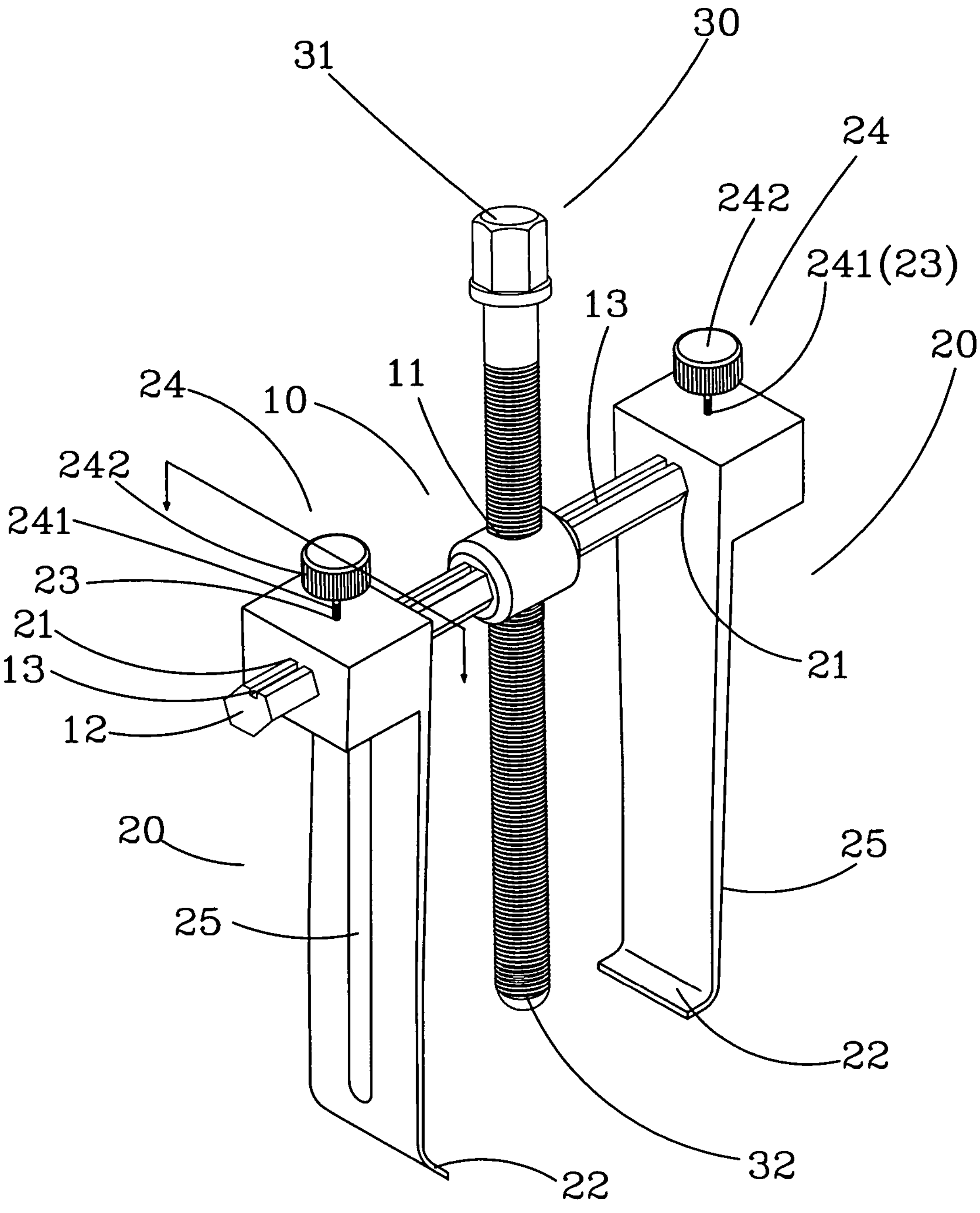
FIG. 1 is a perspective view of a forced puller in accordance with the present invention.
Figure 2:
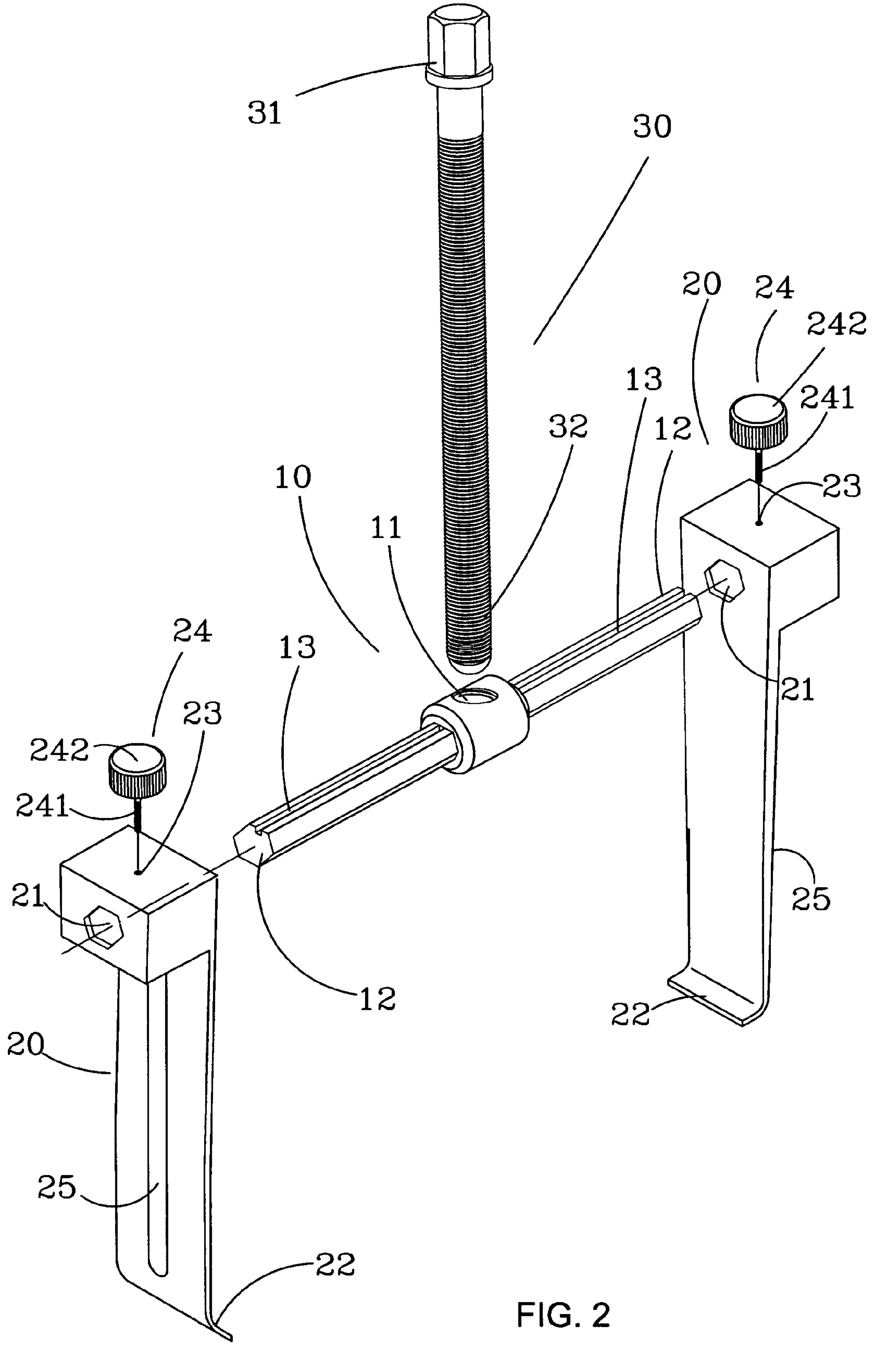
FIG. 2 is an exploded perspective view of the forced puller in FIG. 1.

Referring to the drawings and initially to FIGS. 1 and 2, a forced puller in accordance with the present invention comprises a central seat (10), two hook members (20) respectively disposed to two opposite sides of the central seat (10) and a main threaded rod (30) extending through the central seat (10).

The central seat (10) includes a threaded hole (11) centrally defined therein and extending therethrough. Two polygonal rods (12) respectively perpendicularly extend from the two opposite side of the central seat (10) relative to an axis of the threaded hole (11). In the preferred embodiment of the present invention, each polygonal rod (12) has a hexagon cross-section. Each polygonal rod (12) has a groove (13) defined in one face thereof.

Each hook member (20) has a polygonal through hole (21) defined near a first end thereof for slidably receiving a corresponding one of the two polygonal rods (12) and a hook (22) formed on a second end of each of the two hook members (20), wherein the two hooks (22) are faced to each other. Each hook member (20) has a threaded hole (23) defined therein and communicating with the groove (13) in the corresponding polygonal rod (12). A locking member (24) has a threaded rod (241) crewed into the threaded hole (23) and abutting against a bottom of the groove (13) for holding the hook member (20) in place. The locking member (24) has a head (242) formed thereon for user to easily rotate the threaded rod (241). Each hook member (20) has a rib (25) longitudinally formed thereon for enhancing the structure strength of each of the hook members (20).

The main threaded rod (30) is screwed through the threaded hole (11) in the central seat (10). The main threaded rod (30) has a polygonal head (31) formed on a first end thereof for user to forcefully rotated the main threaded rod (30) by a hand tool, such as a wrench, and a push portion (32) formed on a second end of the main threaded rod (30).

Figure 3:
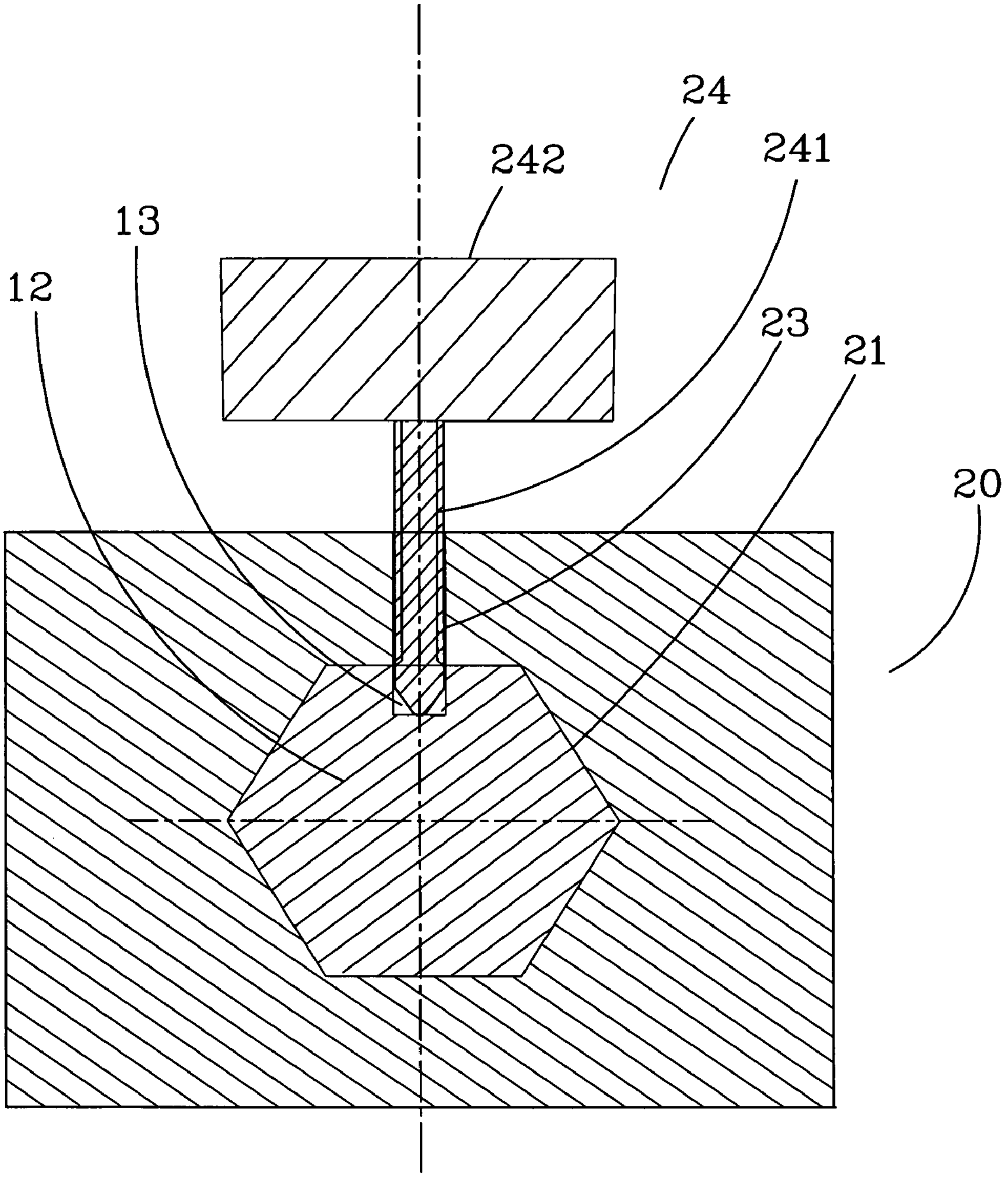
FIG. 3 is a partially cross-sectional view of the force puller of the present invention along line 3-3 in FIG. 1.
Figure 4:
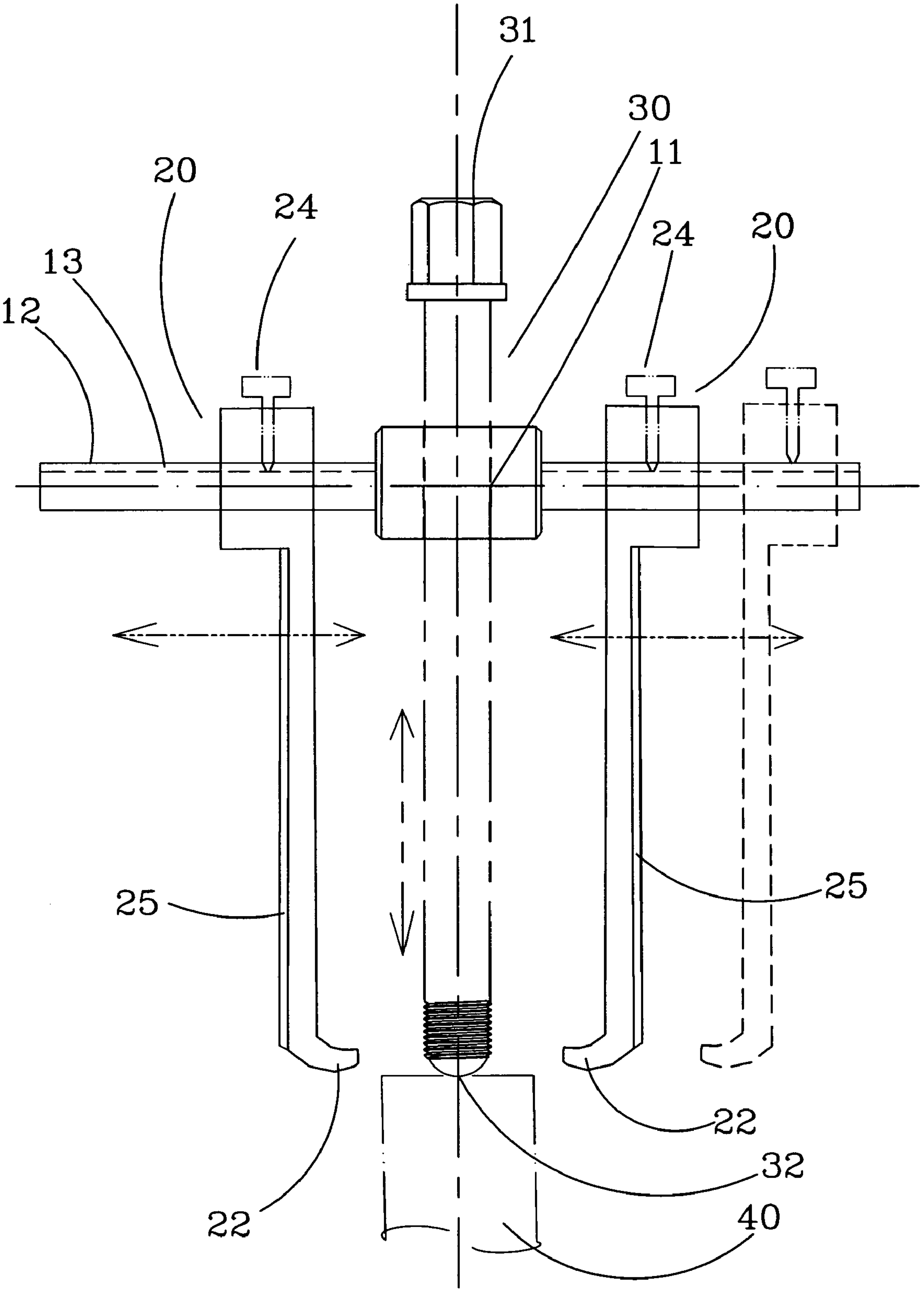
FIG. 4 is an operational view of the forced puller in FIG. 1.

With reference to FIGS. 3 and 4, when operating the forced puller in accordance with the present invention, the two hooks (22) is provided to diametrically engaged to the workpiece (40) that is purposed to be detached and the push portion (32) securely and longitudinally abuts against the workpiece (40) after rotating the main threaded rod (30). The hook member (20) does not be rotated relative to the polygonal rod (12) during operating because the polygonal through hole (21) and the polygonal rod (12) complementally correspond to each other. In addition, the threaded rod (241) extends into the groove (13) and securely abuts against the bottom of the groove (13) such that the hook member (20) does not be slid relative to the polygonal rod (12) during operating. As described above, the relative positions of the two hook members (20) and the central seat (10) would not be changed such that the forced puller in accordance with the present invention can stably and longitudinally detach the workpiece (40).

Figure 5:
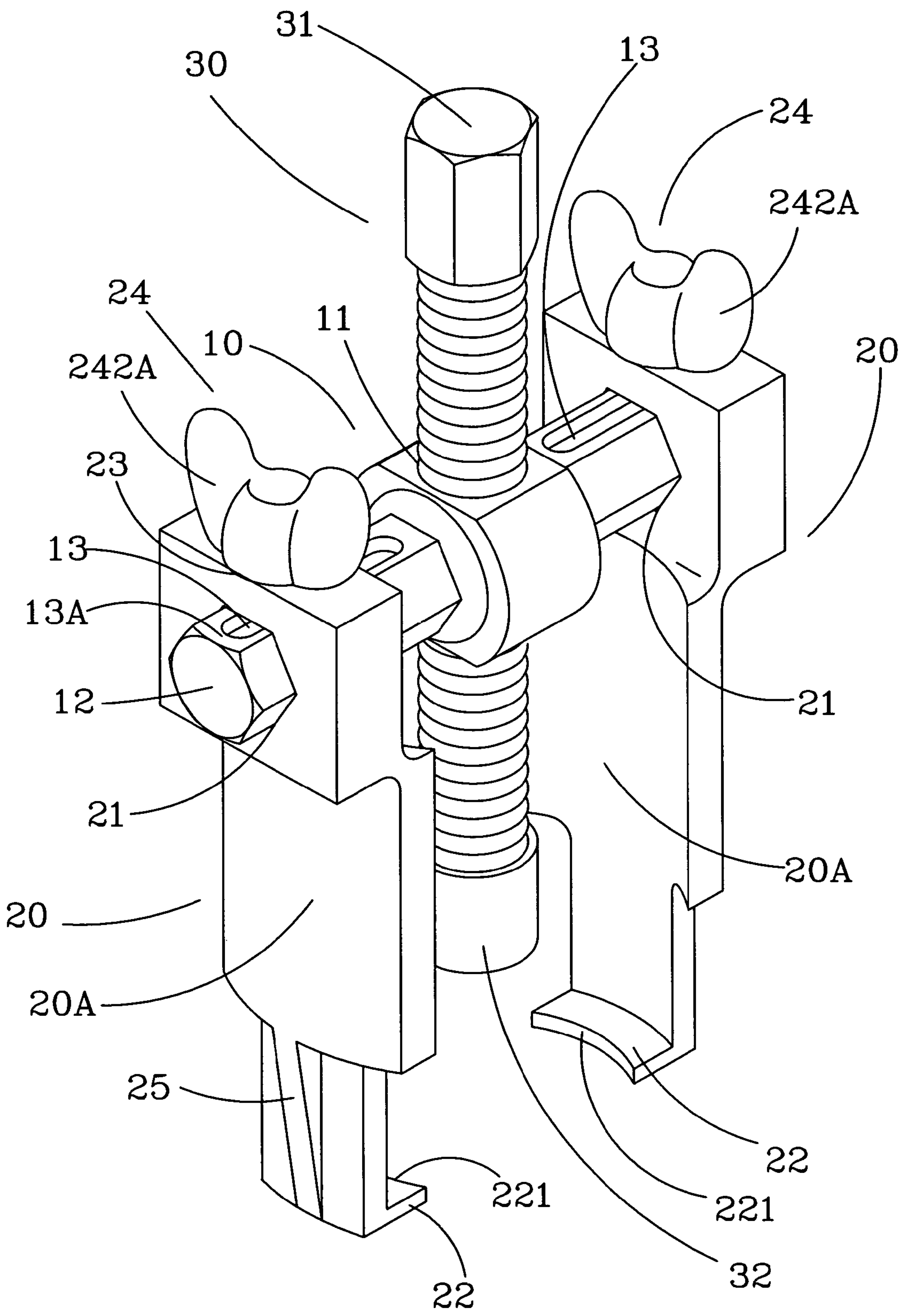
FIG. 5 is a perspective view of a second embodiment of the forced puller in accordance with the present invention.
Figure 6:
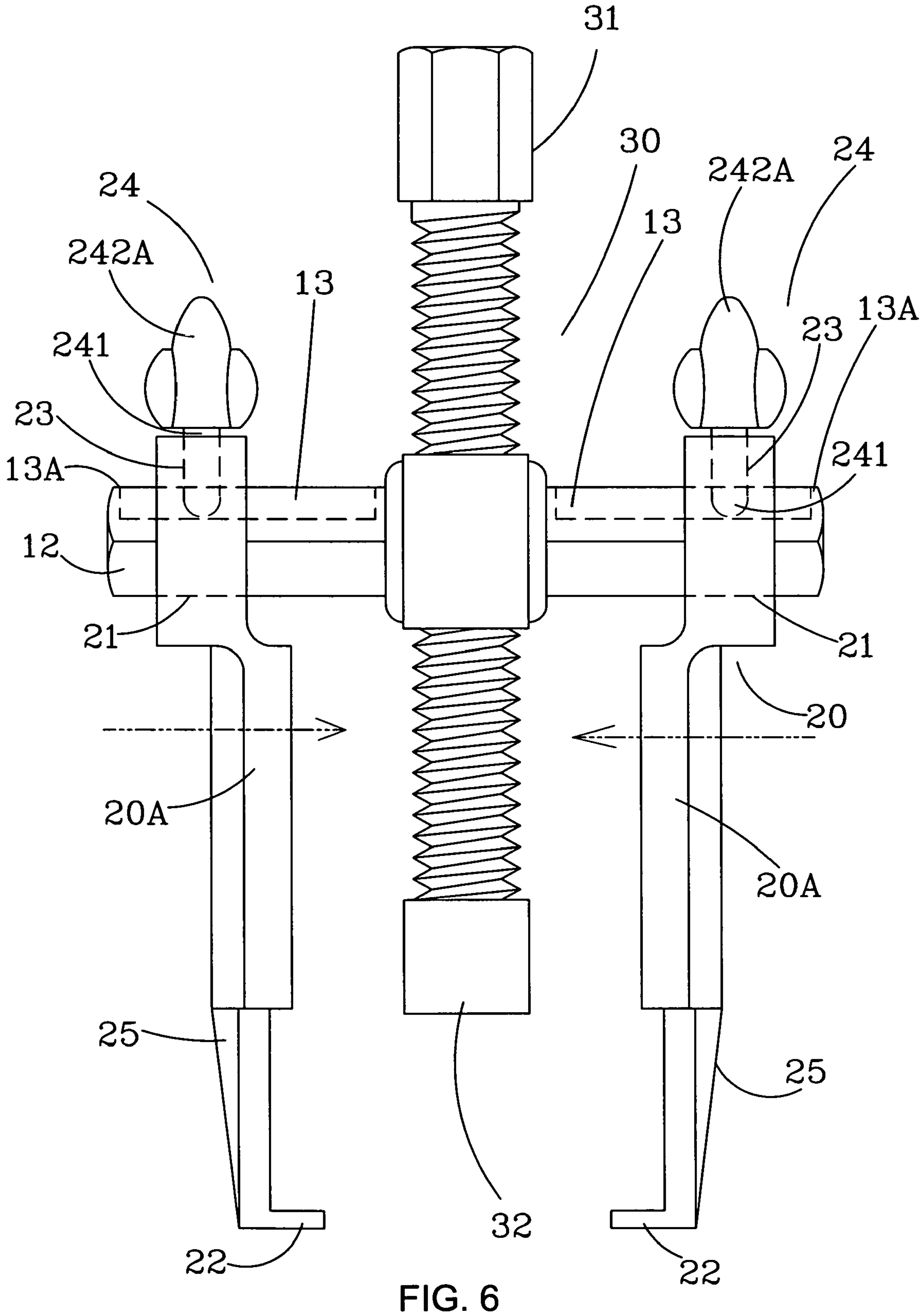
FIG. 6 is a front plan view of the forced puller in FIG. 5.
Figure 7:
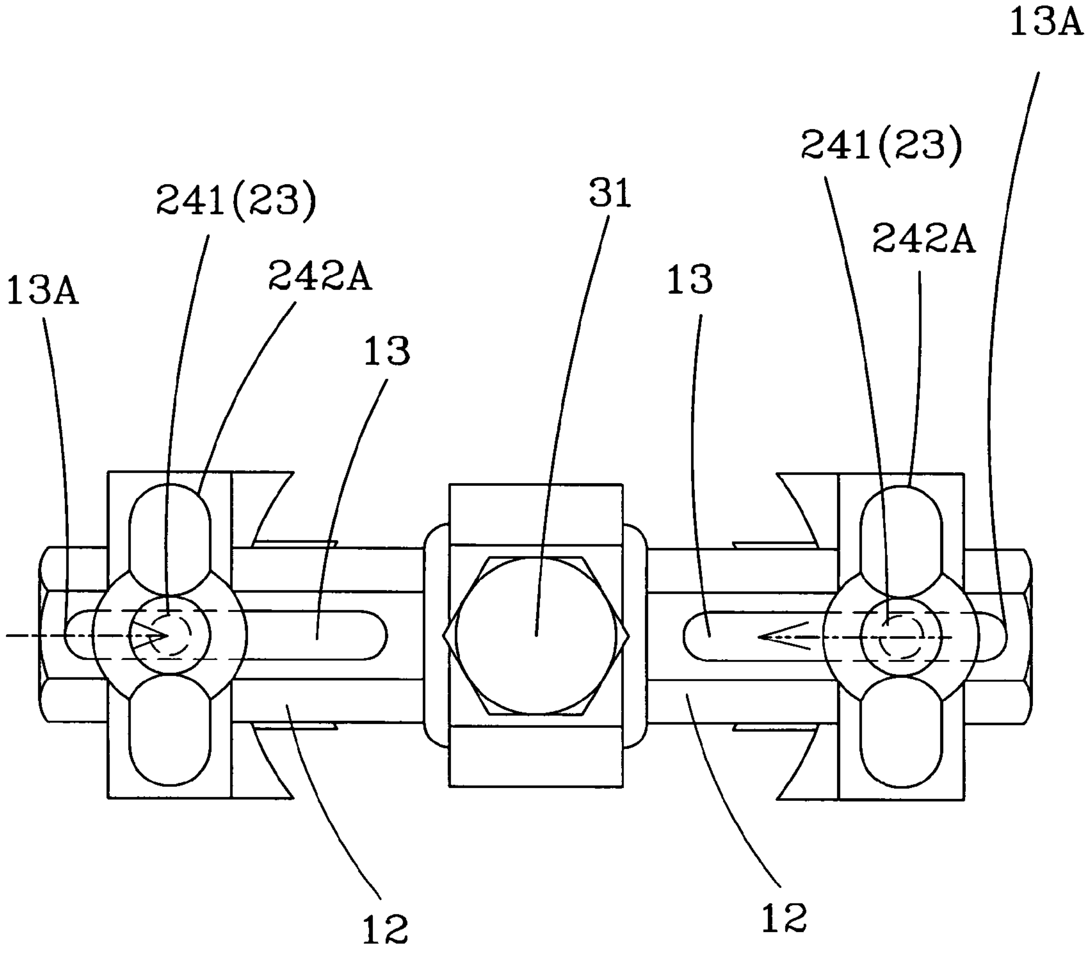
FIG. 7 is a top plan view of the forced puller in FIG. 5.
Figure 8:
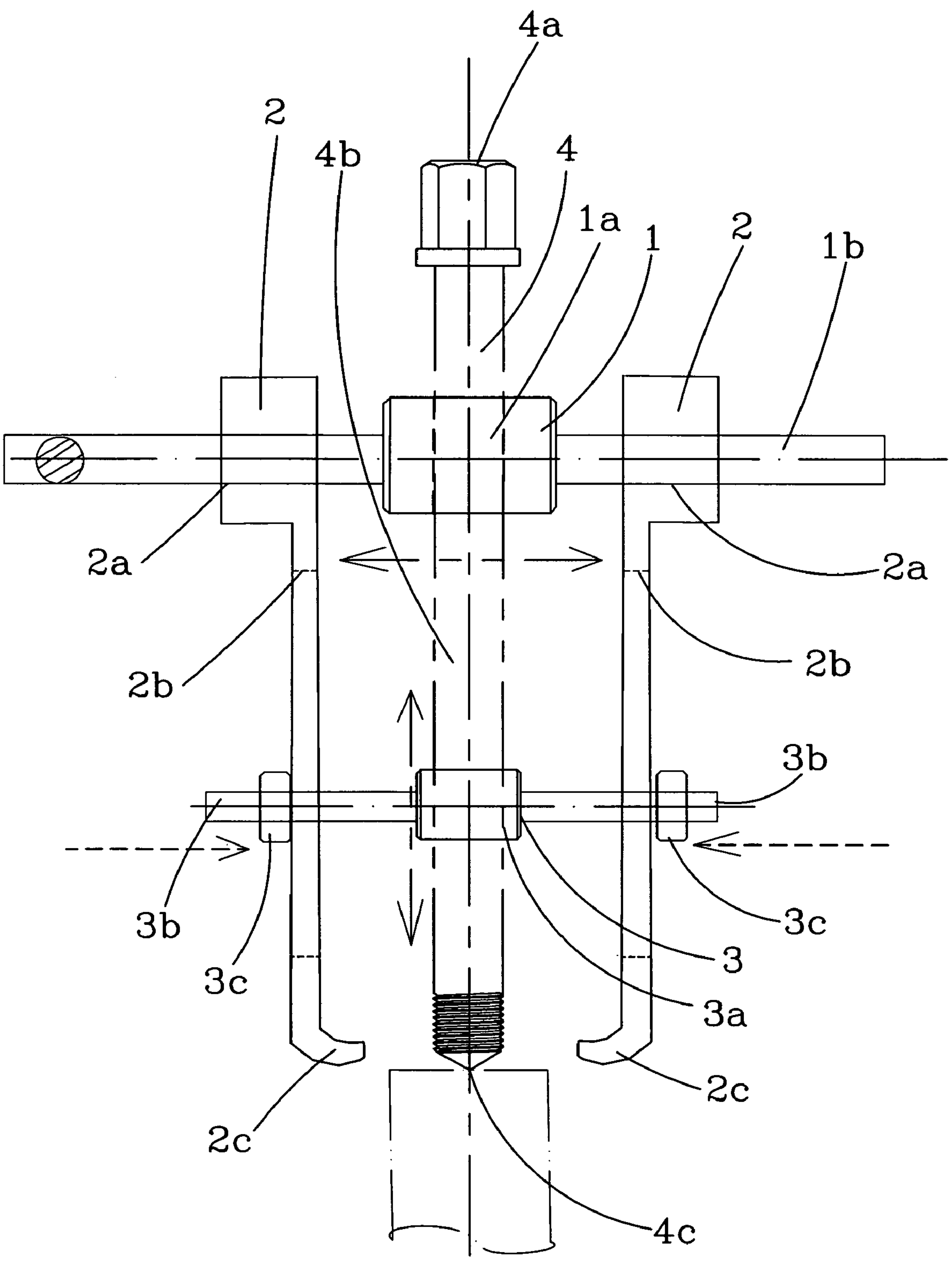
FIG. 8 PRIOR ART
FIG. 8 is a front plan view of a conventional forced puller in accordance with the present invention.

With reference to FIGS. 5-7 that show a second embodiment of the forced puller in accordance with the present invention, in this embodiment, each polygonal rod (12) has a limit (13A) formed on a distal end of the groove (13) such that the hook member (20) does not detach from the polygonal rod (12) when adjust the hook member (20) because the free end of the threaded rod (241) is received in the groove (13). The locking member (24) has a wing head (242A) formed thereon for user to easily rotate the threaded rod (241). The hook member (20) has an arm (20A) extending therefrom and integrally formed with a curved hook (221) for promoting the strength of the structure of the two hook members (20). In addition, the curved hook (221) can be securely engaged to the workpiece (40) that is purposed to be detached.

Although the invention has been explained in relation to its preferred embodiment, it is to be understood that many other possible modifications and variations can be made without departing from the spirit and scope of the invention as hereinafter claimed.

What is claimed is:

1. A forced puller comprising:

a central seat having a threaded hole centrally defined therein and extending therethrough, the central seat having two opposite sides each having a rod perpendicularly extending therefrom relative to an axis of the threaded hole, each rod having a groove longitudinally defined in an outer periphery thereof;

two hook members respectively slidably mounted to a corresponding one of the two rods, each hook member formed with a hook adapted to be engaged to a workpiece that is purposed to be detached, each hook member having a locking extending therethrough and partially received in a corresponding one of the two grooves for holding the hook member in place; and a main threaded rod screwed through the threaded hole in the central seat, the main threaded rod having a polygonal head formed on a first end thereof for user to forcefully rotated the main threaded rod and a push portion formed on a second end of the main threaded rod to securely and longitudinally abut against the workpiece after rotating the main threaded rod;

wherein the rod of the central seat has a polygonal cross-section and each hook member has polygonal through hole defined to selectively and slidably received the rod to prevent the hook member from being rotated relative to the rod;

wherein each of the rods of the central seat and the polygonal through hole in each of the hook member has a hexagon cross-section.

* * * * *